(12) United States Patent
Delmoni

(10) Patent No.: US 10,526,145 B2
(45) Date of Patent: Jan. 7, 2020

(54) TRIM CHUTE

(71) Applicant: Alex Delmoni, Stockton (AU)

(72) Inventor: Alex Delmoni, Stockton (AU)

( * ) Notice: Subject to any disclaimer, the term of this patent is extended or adjusted under 35 U.S.C. 154(b) by 0 days.

(21) Appl. No.: 15/738,680

(22) PCT Filed: Mar. 31, 2016

(86) PCT No.: PCT/AU2016/050242
§ 371 (c)(1),
(2) Date: Dec. 21, 2017

(87) PCT Pub. No.: WO2016/205871
PCT Pub. Date: Dec. 29, 2016

(65) Prior Publication Data
US 2018/0162643 A1 Jun. 14, 2018

(30) Foreign Application Priority Data
Jun. 24, 2015 (AU) .................... 2015902436

(51) Int. Cl.
*B65G 11/12* (2006.01)
*B65G 67/06* (2006.01)
*B65G 69/04* (2006.01)
*B65G 11/20* (2006.01)

(52) U.S. Cl.
CPC .......... *B65G 11/126* (2013.01); *B65G 11/206* (2013.01); *B65G 67/06* (2013.01); *B65G 69/0441* (2013.01)

(58) Field of Classification Search
CPC .... B65G 11/126; B65G 11/206; B65G 67/06; B65G 69/0441; B65G 11/12; B65G 11/123
See application file for complete search history.

(56) References Cited

U.S. PATENT DOCUMENTS

| 1,863,028 A | * | 6/1932 | Pardee | B65G 11/206 193/17 |
| 2,219,226 A | * | 10/1940 | Gerber | B65G 47/72 193/17 |
| 4,372,730 A | * | 2/1983 | Ladt | B65G 67/06 193/21 |
| 4,659,274 A | * | 4/1987 | France | B65G 67/22 177/163 |
| 5,909,999 A | * | 6/1999 | Manstrom | B65G 67/22 177/163 |

FOREIGN PATENT DOCUMENTS

| CN | 101759043 | 6/2010 |
| CN | 203079339 | 7/2013 |
| CN | 204198028 | 3/2015 |

OTHER PUBLICATIONS

International Search Report for Application No. PCT/AU2016/050242 dated May 3, 2016 (3 pages).

* cited by examiner

*Primary Examiner* — Mark A Deuble
(74) *Attorney, Agent, or Firm* — Michael Best & Friedrich LLP

(57) ABSTRACT

A trim chute for a loading apparatus for loading particulate material into a container, the trim chute being configured to be engaged with the loading apparatus to direct particulate material into the container, the trim chute being moveable with respect to the loading apparatus during loading, movement of the trim chute effecting a change in flow of the particulate material into the container.

14 Claims, 8 Drawing Sheets

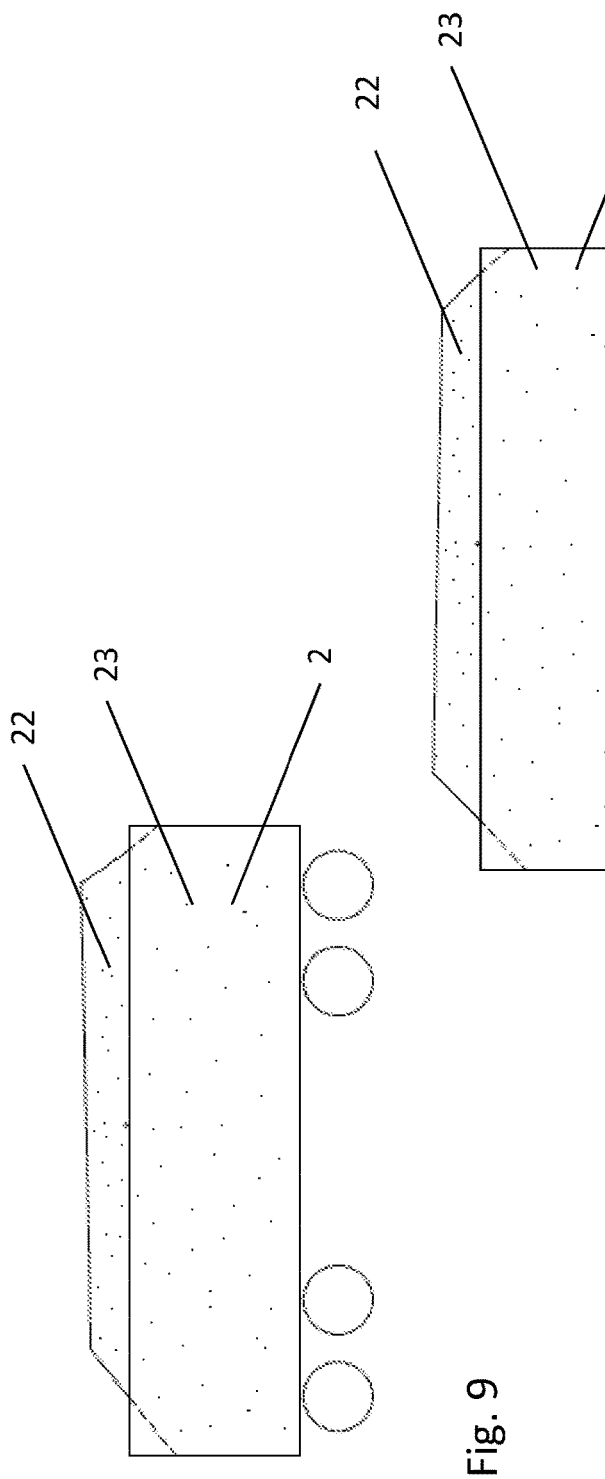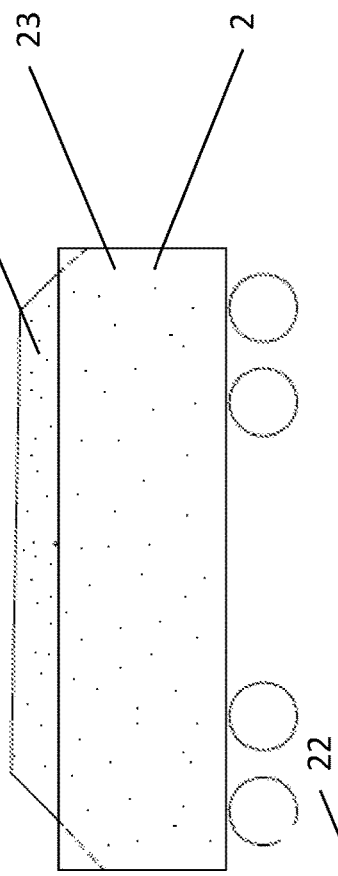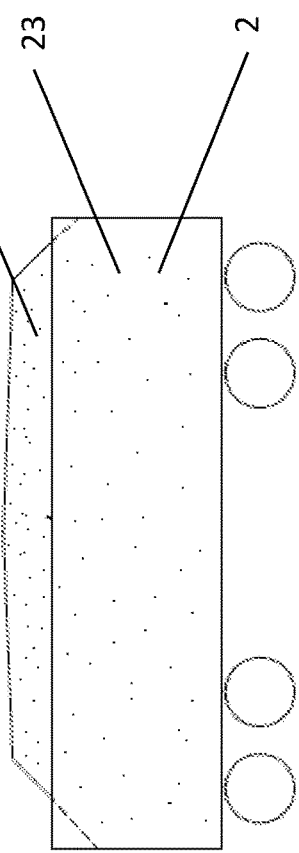
Fig. 9
Fig. 10
Fig. 11

TRIM CHUTE

BACKGROUND

The disclosure relates to material handling, and more particularly to an apparatus and method for loading particulate matter into a transport container.

SUMMARY

Disclosed in some forms is a trim chute for a loading apparatus for loading particulate material into a container, the trim chute being configured to be engaged with the loading apparatus to direct particulate material into the container, the trim chute being moveable with respect to the loading apparatus during loading, movement of the trim chute effecting a change in flow of the particulate material into the container.

The adjustable trim chute allows for variation in desired levels and volumes of the particulate material to be brought about through adjustment of the trim chute while loading occurs. This allows for the wagon load profile height to be managed and the volume of material to be designed to suit certain specifications. Further, loading can be adapted to reduce initial spill.

In another aspect, disclosed is a method of loading a container, the method comprising depositing particulate material into the container through a loading apparatus, the loading apparatus having a chute body and a trim chute located at an outlet end of the chute body; and, adjusting the angle of the trim chute with respect to the chute body to adjust the flow of the particulate material.

The method allows for dynamic adjustment of load profiles and weight of material in the container.

BRIEF DESCRIPTION OF THE FIGURES

The embodiments will now be described in view of the Figures, in which,

FIG. 9 shows the container load profile of another trim chute setting;

FIG. 10 shows the container load profile of another trim chute setting;

FIG. 11 shows the container load profile of another trim chute setting;

DETAILED DESCRIPTION OF EMBODIMENTS OF THE DISCLOSURE

Figure 1:
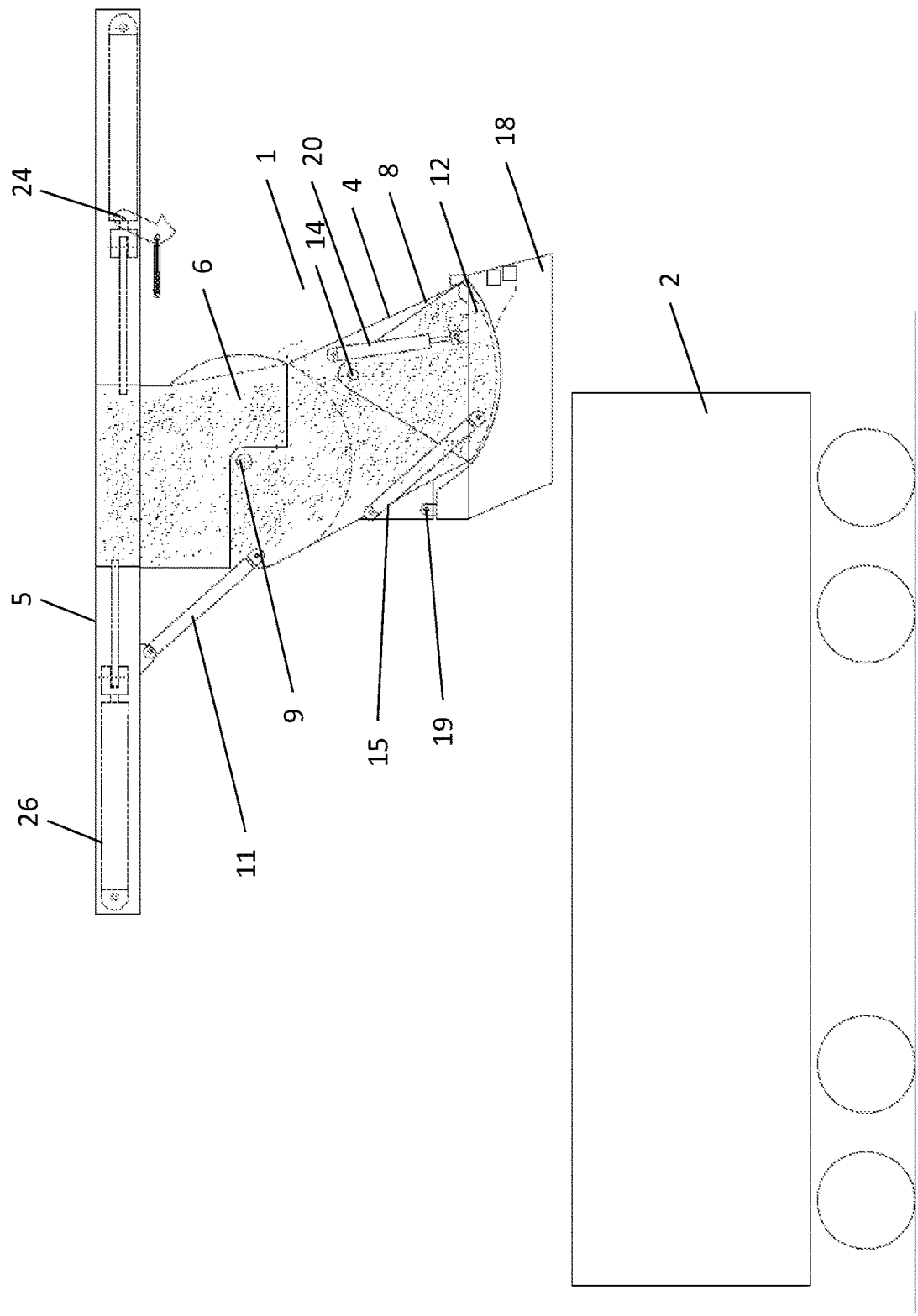
FIG. 1 shows a side plan view of a trim chute of one embodiment of the disclosure in use in a loading arrangement.

Disclosed in some forms is a trim chute for a loading apparatus for loading particulate material into a container, the trim chute being configured to be engaged with the loading apparatus to direct particulate material into the container, the trim chute being moveable with respect to the loading apparatus during loading, movement of the trim chute effecting a change in flow of the particulate material into the container.

In some forms the trim chute is engaged with the loading apparatus by means of at least one extendable arm, movement of the extendable arm effecting movement of the trim chute with respect to the loading apparatus.

In some forms the extendable arm is configured to move the trim chute while material is flowing through the trim chute.

In some forms movement of the trim chute with respect to the loading apparatus is angular.

In some forms the loading apparatus comprises a chute and the trim chute is adapted to engage with the chute to allow flow of material through the chute and out the trim chute.

In another aspect, disclosed is a method of loading a container, the method comprising depositing particulate material into the container through a loading apparatus, the loading apparatus having a chute body and a trim chute located at an outlet end of the chute body; and, adjusting the angle of the trim chute with respect to the chute body to adjust the flow of the particulate material.

In some forms, the step of adjusting the angle of the trim chute is performed during loading.

In some forms, the step of adjusting the angle of the trim chute is performed by at least one extendable arm.

In some forms, the hydraulic arm is configured to attach the trim chute to the chute body.

In some forms, the angle of the trim chute is adjusted to provide a desired container load profile.

In some forms the container is a rail wagon.

In another aspect, disclosed is an apparatus for loading particulate material into a container, the apparatus comprising a primary chute having an outlet, a trim chute engaged with the primary chute and moveable with respect to the primary chute wherein movement of the trim chute with respect to the primary chute adjusts flow of material into the container.

In some forms, the trim chute is engaged with the primary chute by at least one trim chute extendable arm, the trim chute extendable arm effecting movement of the trim chute with respect to the primary chute.

In some forms, the movement of the trim chute with respect to the primary chute is an angular movement, adjusting the angle of the trim chute.

In some forms the trim chute includes an outlet that feeds directly into the container.

In some forms the container comprises a rail wagon.

In some forms the primary chute comprises a fixed chute through which particulate material is received in use, and a swing chute adapted to extend from the fixed chute.

In some forms the swing chute is angularly moveable with respect to the fixed chute.

In some forms the swing chute is moveable to adopt a raised position when not in use.

In some forms the apparatus further comprises a moveable barrier engaged with the primary chute and moveable to adopt a closed configuration wherein the outlet is obstructed and an open configuration.

In some forms, the barrier comprises a single clamshell bucket.

In some forms, the bucket is engaged with the primary chute by means of at least one barrier hydraulic arm which effects movement of the bucket between its closed and open configurations.

In some forms, extension of the barrier hydraulic arm causes the bucket to adopt the open configuration.

Referring to FIG. 1, disclosed is a chute assembly 1 for loading particulate material into a container 2. In the illustrated form the container is a rail wagon.

In the illustrated form, the chute assembly 1 comprises a chute body 4 extending from a gateframe 5. The chute body 4 comprises a fixed chute 6 located proximal the gateframe 5 and into which material initially flows. A swing chute 8 is engaged with the fixed chute 6 by means of a pin 9. A swing chute hydraulic arm 11 engages the swing chute 8 and the gateframe 5.

Figure 2:
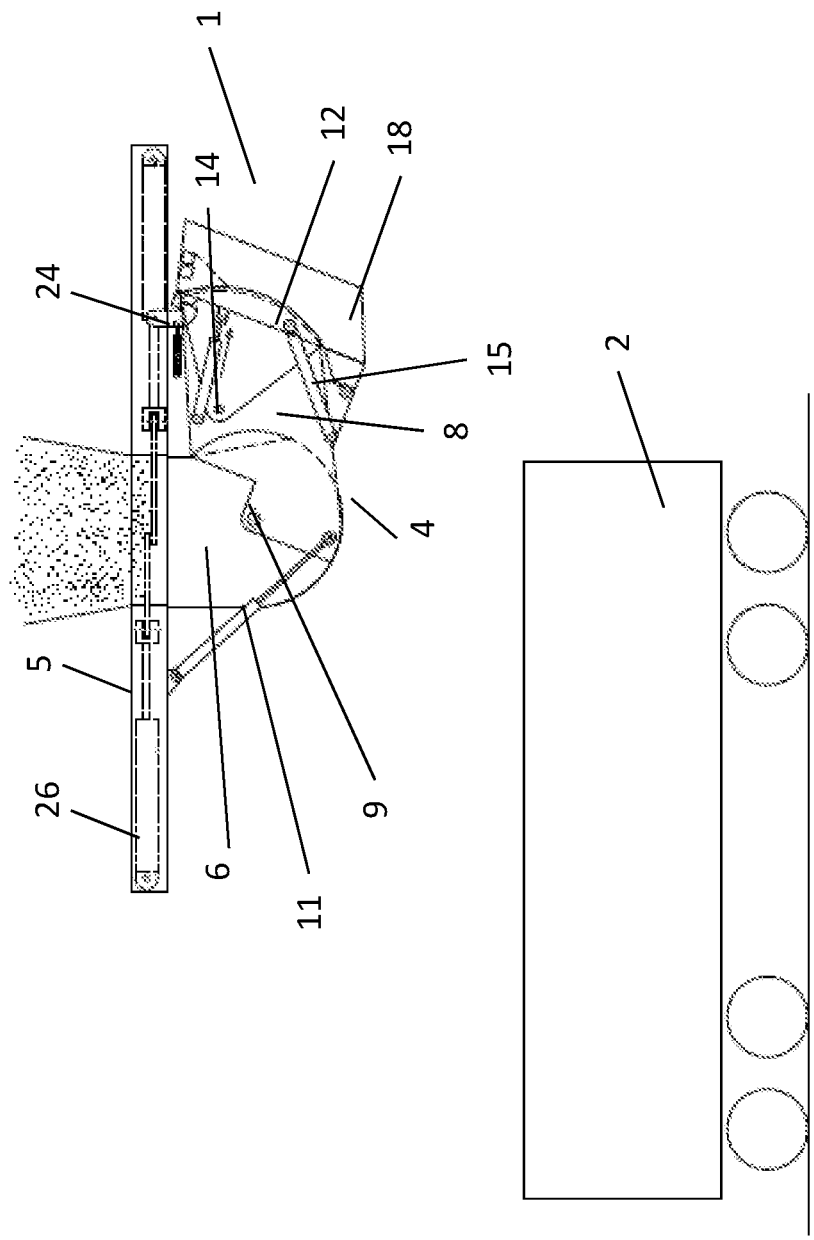
FIG. 2 shows the loading arrangement of FIG. 1, with the swing chute in a raised position.

The swing chute 8 is moveable from the lowered position illustrated in FIG. 1 into a raised position which is best shown in FIG. 2. Movement of the hydraulic arm 11 moves the swing chute from the lowered position into the raised position through rotation about pin 9.

In the illustrated form, a barrier in the form of a single clamshell bucket 12 is located in and engaged with the swing chute 8. The bucket is rotatable about axis 14 to move the bucket between the closed configuration shown in FIG. 1 and an open configuration. A bucket hydraulic arm 15 effects movement of the bucket 12 between its closed and open positions.

In the illustrated form, guillotine gates 26 block particulate material from the chute in a closed position and open to allow material through.

In its closed position, as shown in FIG. 1, the clamshell bucket blocks flow of particulate material from the swing chute 8.

A trim chute 18 is engaged with the swing chute 8 at pin 19. A trim chute hydraulic arm 20 also engages the trim chute 18 and attaches it with the swing chute 8. The trim chute 18 is moveable with respect to the swing chute 8 about pin 19 by movement of an extendable arm in the form of trim chute hydraulic arm 20.

While the illustrated form shows the adjustable trim chute in use with a fixed chute and swing chute system, the trim chute can be utilized with other chutes such as fixed chutes and lowering telescopic chutes with either single or twin guillotine gates. Most coal loaders are a guillotine style with a lowering telescopic or cross traversing chute which floods and empties with each wagon. The chutes either side traverse or raise to clear the locomotives.

Adjustment of the trim chute is performed using a data system into which weight data is fed from scales on outgoing rails which measure the bogie, axle, wheel and front/rear wagon masses.

Referring now to FIG. 2, the swing chute 8 is rotatable with respect to the fixed chute 6 in order to move the swing chute 8 into its raised position that is shown in FIG. 2. In its raised position the chute assembly 1 is out of the way of a wagon 2 moving through when loaded. A lock hook or latch 24 is attached to the gateframe 5 and secures the swing chute 8 in the raised position when the system is not in use. The lock hook or latch 24 can be either a single latch or a double latch in which case one is located on each side of the gateframe 5. This is operated by spring extended cylinders. The lock is required as when the system is left unused for long periods, the latch prevents the chute creeping down which could cause an interaction with a locomotive or loaded wagons or rail maintenance equipment travelling through.

Figure 3:
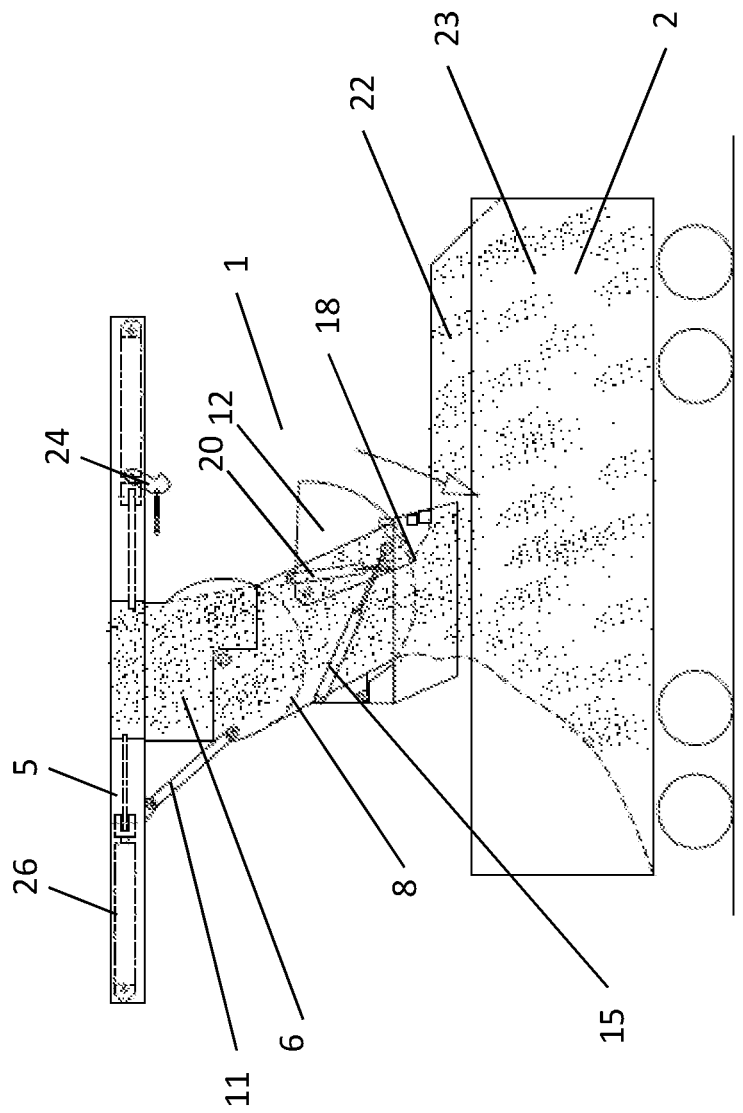
FIG. 3 shows a side plan view of the loading arrangement of FIG. 1 in use with the trim chute in a lowered configuration.
Figure 4:
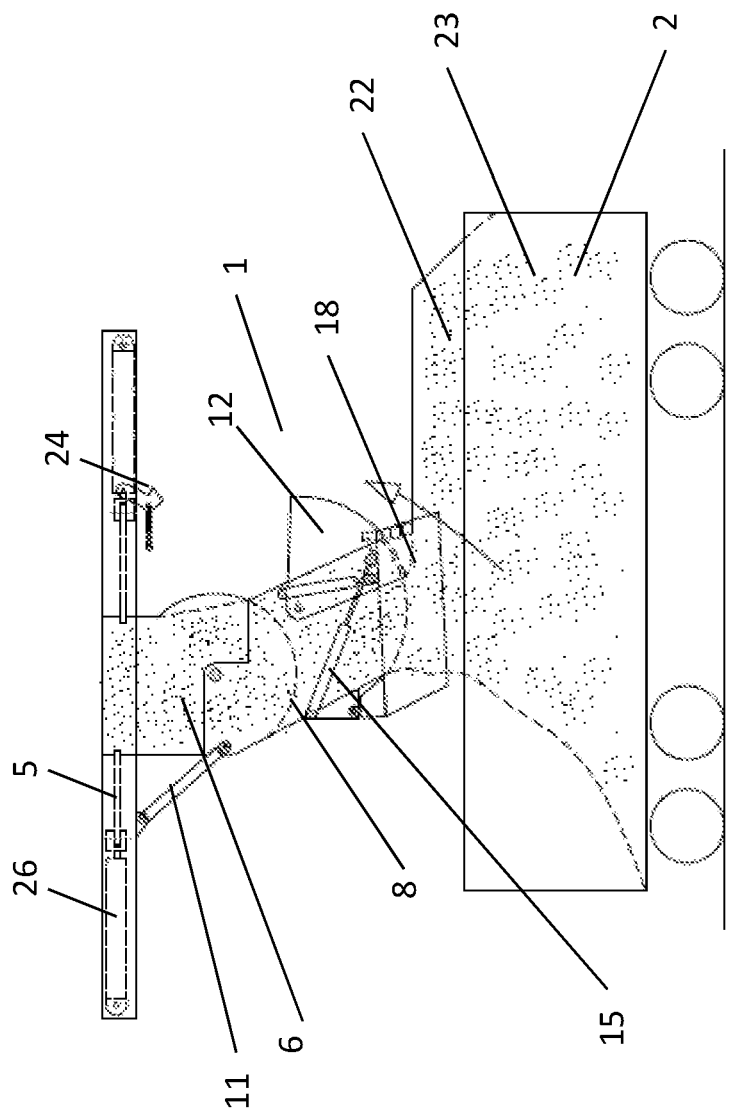
FIG. 4 shows a side plan view of the loading arrangement of FIG. 1 in use with the trim chute in a raised configuration.

Referring now to FIGS. 3 and 4, the trim chute 18 is angularly moveable with respect to the swing chute 8 and fixed chute 6. In the illustrated form, movement of the trim chute 18 is effected by movement of the trim chute hydraulic arm 20, however alternative dynamic configurations would allow similar movement of the trim chute 18. For example, telescoping arms such as electric or alternatively powered linear actuators or other extendable arms could be utilised.

As shown in FIG. 3, in the lowered position the trim chute provides a container load profile 22 of the particulate material 23 that has a specified height above the container 2. As shown in FIG. 4, in the raised position the height of the container load profile 22 above the container 2 is greater.

Figure 5:
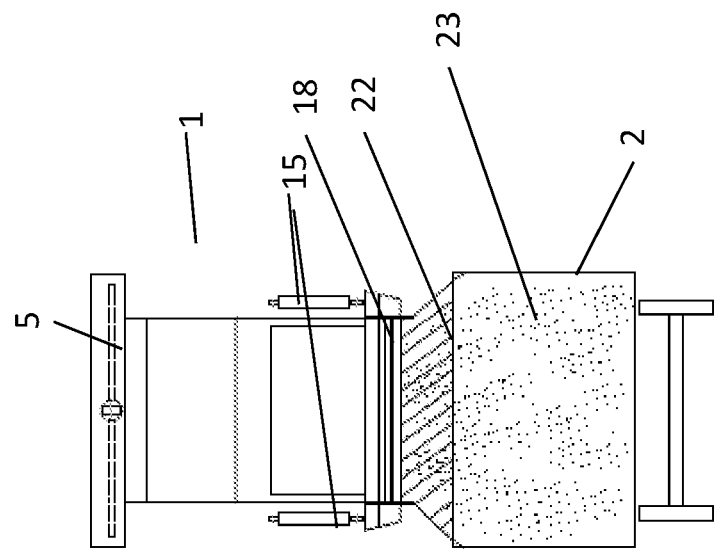
FIG. 5 shows an end view of the loading arrangement of FIG. 3, showing the container load profile height.
Figure 6:
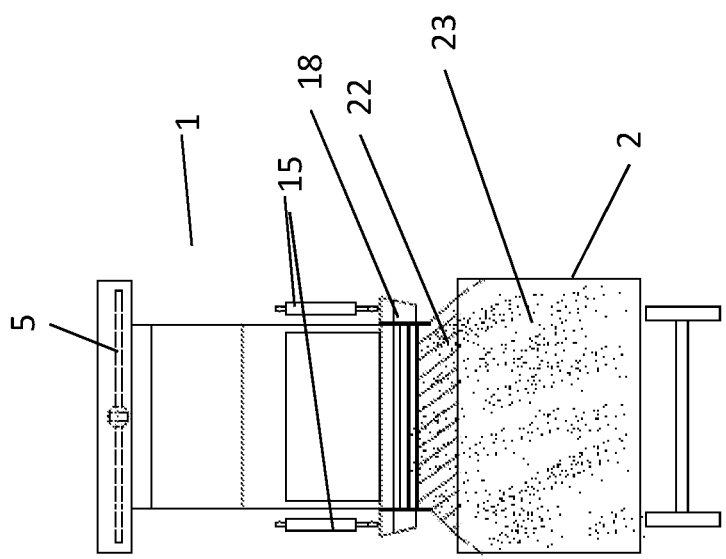
FIG. 6 shows an end view of the loading arrangement of FIG. 4, showing the container load profile height.

FIGS. 5 and 6 show end views of the container load profiles of FIGS. 3 and 4.

The variable trim system allows for full flow through the vertical areas (y axis) of the chutes and controls the load level (trim) along the horizontal plane (x axis). The adjustable trim system has been designed to provide a variable y axis load height profile.

Referring now to FIGS. 7 through 11, variations in load height throughout the full profile of the container are enabled by the adjustable trim chute 18. This dynamic adjustment provides loaded volume and subsequent mass variations from front to rear of the wagon while the wagon loads through feedback provided without needing to alter the opening distances.

Figure 7:
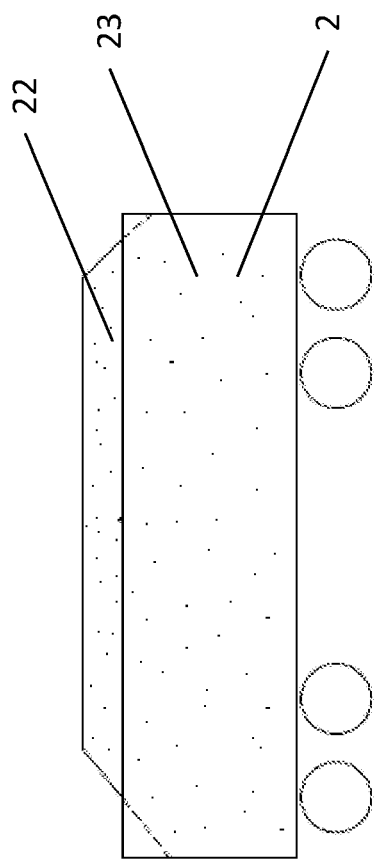
FIG. 7 shows the container load profile of one trim chute setting.
Figure 8:
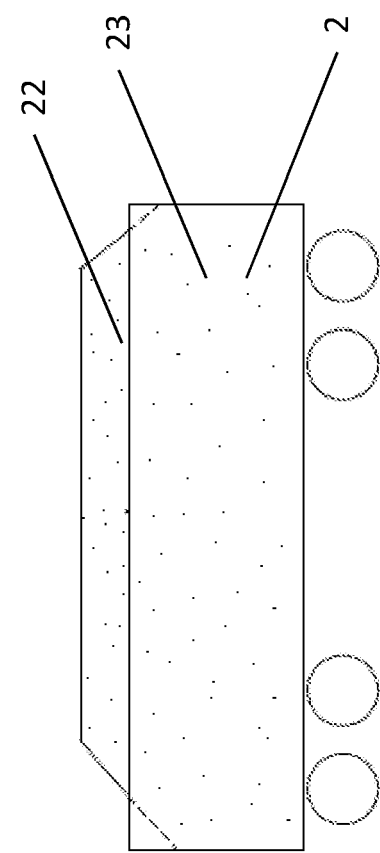
FIG. 8 shows the container load profile of another trim chute setting.

In FIG. 7, the container load profile 22 is level and relatively low. In FIG. 8, the container load profile 22 is level and is high. This variation is produced by adjusting the trim chute 18 from a lowered setting to a raised setting.

Higher wagon load profiles result in an increase of transported particulate material. This results in cost and efficiency savings.

In FIGS. 9 through 11, the container load profile varies across the load. This variation is produced by varying the angle of the trim chute while the loading is occurring.

In FIG. 9, the load profile 22 is tapered from front to rear, as the trim chute 18 is lowered during filling. This is useful when a wagon weighs in with the rear bogies as being underweight with the bulk load longitudinal profile being flat and the front bogies weigh in as correct. The PLC records the wagon weight disparity input data and calculates the correction requirement. Trim height and opening distance for the front of the subsequent wagon remains "as is", while the load will taper up from front to rear.

In FIG. 10, the load profile 22 is raised from front to rear. In circumstances wherein the wagon weighs in with the front bogies as being underweight with the bulk load longitudinal profile being flat this profile would be desirable and the system can correct for it.

In FIG. 11, the container load profile 22 peaks in the centre.

The flat, tapered or peaked load over length of the wagon correct for weight imbalances from track scale data input received from previous wagons. The load can be automatically adjusted from the plc and corrected from track scale data input received from previous wagons.

Figure 12:
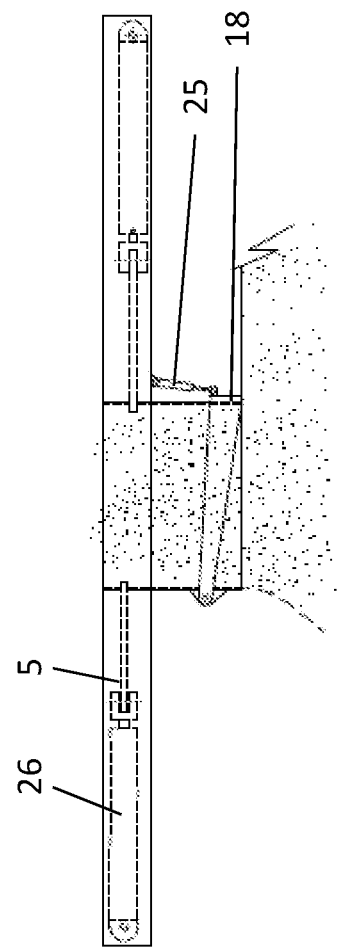
FIG. 12 shows a side plan view of a trim chute of another embodiment of the disclosure in use with a fixed chute system.
Figure 13:
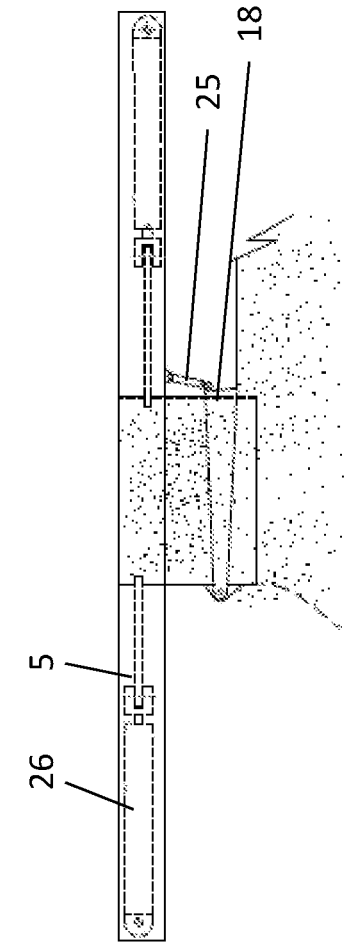
FIG. 13 show the trim chute of FIG. 12 in a raised configuration.

Referring now to FIGS. 12 and 13, the trim chute 18 can be utilised with a fixed chute system.

FIG. 12 shows the trim chute 18 in a lowered configuration. The trim chute 18 is engaged with the gateframe 5 by means of at least one hydraulic arm 25. The hydraulic arm engages the trim chute and extends to move the trim chute 18 into the lowered configuration. In this embodiment guillotine gates 26 are also shown in the open position.

FIG. 13 shows the trim chute 18 in a raised configuration. The trim chute 18 is engaged with the gateframe 5 by means of at least one hydraulic arm 25. The hydraulic arm engages the trim chute and is retracted to move the trim chute 18 into the lowered configuration.

The adjustment of the trim chute can be adapted to reduce and prevent initial front overspill of the wagons by lowering the trim chute upon wagon presentation and then raising it to the required level once the initial surge/flood has completed. Dependent upon requirements this can be integrated into the PLC program to operate with each wagon.

The hydraulic supply for the adjustable or dynamic trim chute is generally sourced from the original system chute pressure supply, main return and drain lines tee connections. The small volume and power required to operate the adjustable trim system is minimal and has minimal or no effect on the functioning of the OEM designed main system Control valving and components are incorporated in a purpose designed stand alone manifold assembly mounted to the underside of or near the gateframe The trim system is able to be isolated from the main hydraulic system by lockable isolation valves. Dynamic trim system operating maximum speed is controlled by a flow control valve. In most systems a failsafe (emergency shutdown) valve is energized throughout the loading process (for the train duration) unless an emergency shutdown occurs.

The failsafe valve is identical to the main hydraulic system failsafe emergency shutdown valve and energisation operates in parallel.

A double solenoid valve raises, lowers or maintains the chute in the desired position upon being energized or de-energised.

The system is designed so that irrespective of whatever signal at the time is for raise, lower or maintain position, the failsafe operation will be prioritized for the emergency shutdown and the normal control signal will be negated.

While the disclosure is directed toward filling rail wagon containers with particulate material, such as iron ore, it will be clear that alternative materials and alternative container settings may be utilised in line with the disclosure of the application. The chute system can also be utilised in typical truck loader operation and in coal chute train loading among other particulate material loading arrangements.

In other alternative arrangements, the trim chute can be applied to a fixed chute system and installed in a blade shape rotating on a mounted hinge at the rear of the chute. The trim arrangement can be either a single or twin actuator operated. Existing designs that are not hydraulically operated can be installed with electric linear actuators for trim adjustment. To provide sufficient clearance from the clamshell bucket, trim chute width can be altered either as a modification to the existing system or a new trim chute designed allowing for additional clearance.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A trim chute for a loading apparatus for loading a load of particulate material into a container, the loading apparatus comprising a loading chute comprising a fixed chute and a swing chute, the swing chute having an inlet end and a loading outlet end, the trim chute being configured to be engaged with the loading outlet end of the swing chute and moveable with respect to the swing chute to form a trim end of the loading chute for trimming the load, the trim chute being angularly moveable with respect to the outlet end of the loading chute during the process of loading, the trim chute being sized and positioned such that angular movement of the trim chute effects a change in angle of the trim end with respect to the load without changing the angle of the loading chute.

2. A trim chute as defined in claim 1, the trim chute being engaged with the loading chute of the loading apparatus by means of at least one extendable arm, movement of the extendable arm effecting movement of the trim chute with respect to the loading apparatus.

3. A trim chute as defined in claim 1, wherein the extendable arm comprises a hydraulic arm.

4. A trim chute as defined in claim 1, wherein the extendable arm comprises a linear actuator.

5. A method of loading a container with particulate material, the method comprising:
   depositing particulate material into the container through a loading apparatus to form a load, the loading apparatus having a chute body and a trim chute located at an outlet end of the chute body; and,
   adjusting the angle of the trim chute with respect to the chute body such that angular movement of the trim chute effects a change in angle of a trim end with respect to the load, the trim chute acting to trim the load,
   wherein the chute body comprises a fixed chute and a swing chute and the trim chute is engaged with and moveable with respect to the swing chute.

6. A method of loading a container with particulate material as defined in claim 5, wherein the step of adjusting the angle of the trim chute is performed during loading.

7. A method of loading a container with particulate material as defined in claim 5, wherein the step of adjusting the angle of the trim chute is performed by at least one extendable arm.

8. A method as defined in claim 5, wherein the extendable arm comprises a hydraulic arm or linear actuator.

9. An apparatus for loading particulate material into a container and trimming a resultant load, the apparatus comprising:
   a primary chute having an outlet, and
   a trim chute engaged with the outlet of the primary chute, the trim chute having a trim end at its outlet, the trim end being configured to trim the load and being moveable with respect to the primary chute wherein movement of the trim chute with respect to the primary chute effects a change in angle of the trim end with respect to the load,
   wherein the primary chute comprises a fixed chute through which particulate material is received in use, and a swing chute adapted to extend from the fixed chute.

10. An apparatus as defined in claim 9, wherein the trim chute is engaged with the primary chute by at least one trim chute hydraulic arm or linear actuator, the trim chute hydraulic arm effecting movement of the trim chute with respect to the primary chute.

11. An apparatus as defined in claim 9, wherein the movement of the trim chute with respect to the primary chute is an angular movement, adjusting the angle of the trim chute.

12. An apparatus as defined in claim 9, wherein the swing chute is angularly moveable with respect to the fixed chute.

13. An apparatus as defined in claim 9, further comprising a moveable barrier engaged with the primary chute and moveable to adopt a closed configuration wherein the outlet is obstructed and an open configuration.

14. An apparatus as defined in claim 13, wherein the barrier comprises a single clamshell bucket.

\* \* \* \* \*